United States Patent
Takano

(10) Patent No.: US 8,861,135 B2
(45) Date of Patent: Oct. 14, 2014

(54) THERMALLY-ASSISTED MAGNETIC WRITE HEAD, HEAD GIMBAL ASSEMBLY, HEAD ARM ASSEMBLY, AND MAGNETIC DISK UNIT

(71) Applicant: TDK Corporation, Tokyo (JP)

(72) Inventor: Kenichi Takano, Tokyo (JP)

(73) Assignee: TDK Corporation, Tokyo (JP)

( * ) Notice: Subject to any disclaimer, the term of this patent is extended or adjusted under 35 U.S.C. 154(b) by 64 days.

(21) Appl. No.: 13/645,057

(22) Filed: Oct. 4, 2012

(65) Prior Publication Data

US 2014/0098439 A1  Apr. 10, 2014

(51) Int. Cl.
  *G11B 5/31*  (2006.01)
  *G11B 13/08*  (2006.01)

(52) U.S. Cl.
  CPC .................................. *G11B 5/3109* (2013.01)
  USPC ................... 360/125.11; 360/59; 360/125.31

(58) Field of Classification Search
  CPC ............ G11B 5/314; G11B 11/10534; G11B 11/10536; G11B 11/10539; G11B 13/04; G11B 13/08; G11B 2005/0021
  See application file for complete search history.

(56) References Cited

U.S. PATENT DOCUMENTS

| 6,649,894 | B2 | 11/2003 | Matsumoto et al. |
| 6,768,556 | B1 | 7/2004 | Matsumoto et al. |
| 7,330,404 | B2 | 2/2008 | Peng et al. |
| 8,169,861 | B1* | 5/2012 | Komura et al. ............ 369/13.33 |
| 2008/0170319 | A1 | 7/2008 | Seigler et al. |
| 2010/0061200 | A1 | 3/2010 | Shimazawa et al. |
| 2011/0058272 | A1* | 3/2011 | Miyauchi et al. ............... 360/59 |
| 2011/0205660 | A1* | 8/2011 | Komura et al. ................. 360/59 |
| 2011/0205661 | A1* | 8/2011 | Komura et al. ................. 360/59 |
| 2011/0222184 | A1* | 9/2011 | Komura et al. ................. 360/59 |

FOREIGN PATENT DOCUMENTS

| JP | A-2001-255254 | 9/2001 |
| JP | B2-4032689 | 1/2008 |
| JP | B2-4104584 | 6/2008 |

* cited by examiner

*Primary Examiner* — Craig A. Renner
(74) *Attorney, Agent, or Firm* — Oliff PLC

(57) ABSTRACT

A thermally-assisted magnetic write head includes a waveguide, a magnetic pole, and a plasmon generator interposed between the waveguide and the magnetic pole. The magnetic pole includes a first surface exposed on an air bearing surface, a second surface facing the plasmon generator, and a third surface connecting the first surface and the second surface.

12 Claims, 11 Drawing Sheets

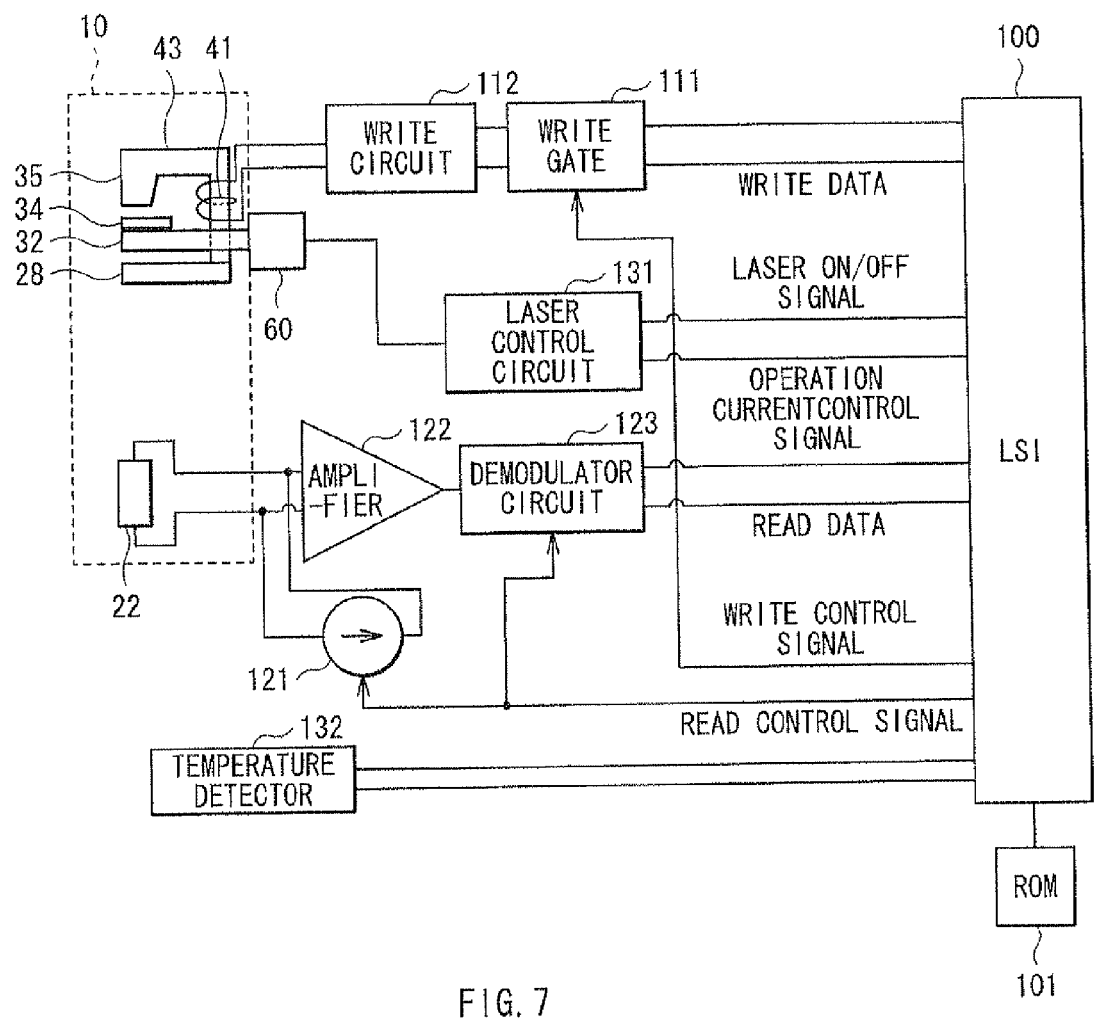
F I G. 7

THERMALLY-ASSISTED MAGNETIC WRITE HEAD, HEAD GIMBAL ASSEMBLY, HEAD ARM ASSEMBLY, AND MAGNETIC DISK UNIT

BACKGROUND OF THE INVENTION

1. Field of the Invention

The present invention relates to a thermally-assisted magnetic write head used in thermally-assisted magnetic writing in which near-field light is applied to a magnetic recording medium to lower a coercivity thereof so as to record information, and to a head gimbal assembly, a head arm assembly, and a magnetic disk unit that are mounted with the thermally-assisted magnetic write head.

2. Description of Related Art

In the past, a magnetic disk unit has been used for writing and reading magnetic information (hereinafter, simply referred to as information). The magnetic disk unit includes, in the housing thereof for example, a magnetic disk in which information is stored, and a magnetic read write head that records information into the magnetic disk and reproduces information stored in the magnetic disk. The magnetic disk is supported by a rotary shaft of a spindle motor, which is fixed to the housing, and rotates around the rotary shaft. On the other hand, the magnetic read write head is formed on a side surface of a magnetic head slider provided on one end of a suspension, and includes a magnetic write element and a magnetic read element that have an air bearing surface (ABS) facing the magnetic disk. In particular, as the magnetic read element, an MR element exhibiting magnetoresistive effect (MR) is generally used. The other end of the suspension is attached to an end of an arm pivotally supported by a fixed shaft installed upright in the housing.

When the magnetic disk unit is not operated, namely, when the magnetic disk does not rotate and remains stationary, the magnetic read write head is not located over the magnetic disk and is pulled off to the outside (unload state). When the magnetic disk unit is driven and the magnetic disk starts to rotate, the magnetic read write head is changed to a state where the magnetic read write head is moved to a predetermined position over the magnetic disk together with the suspension (load state). When the rotation number of the magnetic disk reaches a predetermined number, the magnetic head slider is stabilized in a state of slightly floating over the surface of the magnetic disk due to the balance of positive pressure and negative pressure, and thus, information is accurately recorded and reproduced.

In recent years, along with a progress in higher recording density (higher capacity) of the magnetic disk, improvement in performance of the magnetic read write head and the magnetic disk has been demanded. The magnetic disk is a discontinuous medium including collected magnetic microparticles, and each magnetic microparticle has a single-domain structure. In the magnetic disk, one recording bit is configured of a plurality of magnetic microparticles. Since the asperity of a boundary between adjacent recording bits is necessary to be small in order to increase the recording density, the magnetic microparticles are necessary to be made small. However, if the magnetic microparticles are made small in size, thermal stability of the magnetization of the magnetic microparticles is disadvantageously lowered with decreasing volume of the magnetic microparticles. To solve the issue, increasing anisotropy energy of the magnetic microparticle is effective. However, increasing the anisotropy energy of the magnetic microparticle leads to increase in the coercivity of the magnetic disk, and as a result, difficulty occurs in the information recording in the existing magnetic head.

As a method to solve the above-described difficulty, a so-called thermally-assisted magnetic writing has been proposed. In the method, a magnetic recording medium with large coercivity is used, and when information is written, heat is applied together with the magnetic field to a section of the magnetic recording medium where the information is to be written to increase the temperature and to lower the coercivity of that section, thereby writing the information. Hereinafter, the magnetic head used in the thermally-assisted magnetic writing is referred to as a thermally-assisted magnetic write head.

In performing the thermally-assisted magnetic writing, near-field light is generally used for applying heat to a magnetic recording medium. For example, in Japanese Unexamined Patent Application Publication No. 2001-255254 and in Japanese Patent No. 4032689, disclosed is a technology of allowing frequency of light to coincide with a resonant frequency of plasmons that are generated in a metal, by directly applying the light to a plasmon generator, in order to generate near-field light. In the method of directly applying light to a plasmon generator, however, the plasmon generator itself overheats and accordingly deforms, depending on usage environment or conditions. Therefore, practical realization of the method is difficult.

Therefore, as a technology capable of avoiding such overheating, in Japanese Patent No. 4104584, a thermally-assisted head using surface plasmon polariton coupling is proposed. In this technology, without direct irradiation of light propagating through a waveguide (guided light) to a plasmon generator, the guided light is coupled to the plasmon generator through evanescent coupling, and surface plasmon polaritons generated on a surface of the plasmon generator are used.

In the thermally-assisted writing technology, it is important to generate light spots with a fine diameter. This is because, on the magnetic recording medium, a region (heat spot) heated to a temperature equal to or greater than the Curie temperature Tc is reduced in size as much as possible so that magnetic information recording with higher density is achieved.

Along with reduction of the heat spot, however, recording point in which magnetic recording is actually performed on the magnetic recording medium is away from a magnetic pole that generates a recording magnetic field. This is because the plasmon generator and the magnetic pole are different components arranged adjacent to each other along the air bearing surface, and therefore, generation position of the near-field light is away from the generation point of the recording magnetic field to some extent.

Generally, the recording magnetic field from the magnetic pole toward the magnetic recording medium has high intensity in a region of the magnetic recording medium facing the magnetic pole, and is decreased in intensity with increase in distance from the magnetic pole. Therefore, if the heat spot is made too small, intensity of the recording magnetic field necessary for magnetic recording in a recording point where recording operation should be performed is not obtained. In addition, even if the recording operation is possible, when the recorded region in which desired magnetic information has been written passes through the region facing the magnetic pole, unintentional overwriting may be performed due to an applied recording magnetic field with higher intensity.

Accordingly, it is desirable to provide a thermally-assisted magnetic write head capable of performing accurate recording operation without unintentional overwriting, as well as performing magnetic recording with higher density.

SUMMARY OF THE INVENTION

A thermally-assisted magnetic write head according to an embodiment of the invention includes: a waveguide; a magnetic pole; and a plasmon generator interposed between the waveguide and the magnetic pole. The magnetic pole includes a first surface exposed on an air bearing surface, a second surface facing the plasmon generator, and a third surface connecting the first surface and the second surface.

A head gimbal assembly, a head arm assembly, and a magnetic disk unit according to respective embodiments of the invention each include the above-described thermally-assisted magnetic write head.

In the thermally-assisted magnetic write head, the head gimbal assembly including the same, the head arm assembly including the same, and the magnetic disk unit including the same according to the respective embodiments of the invention, the magnetic pole has the third surface connecting the first surface exposed on the air bearing surface and the second surface facing the plasmon generator. Thus, distribution of the recording magnetic field released from the magnetic pole, along the air bearing surface becomes gentle (the gradient of the magnetic field becomes gentle). In other words, difference between the magnetic field intensity in a position facing the magnetic pole and the magnetic field intensity in a position to be a heat spot facing the plasmon generator is decreased. As a result, when the region where magnetic information has been written (the recorded region) passes through the position facing the magnetic pole, the recorded region is not overwritten unintentionally. Therefore, magnetic recording with high density is allowed to be performed accurately.

In this case, the third surface includes a flat surface inclined with respect to the first surface and the second surface, or includes a curved surface, for example. In addition, a front end of the magnetic pole and a front end of the plasmon generator are preferably away from each other. This is because near-field light generated near an end surface exposed on the air bearing surface, of the plasmon generator is prevented from spreading.

Moreover, in the thermally-assisted magnetic write head, a width of the front end of the magnetic pole is larger than a width of the front end of the plasmon generator, for example. In addition, a width of the waveguide is larger than the width of the front end of the magnetic pole, for example.

Furthermore, the plasmon generator includes, for example, a forward section with a uniform width, and a backward section that is connected to a rear end of the forward section and has a width increasing with increase in distance from the forward section. The waveguide and the plasmon generator are preferably away from each other.

BRIEF DESCRIPTION OF THE DRAWINGS

FIG. 7 is a block diagram illustrating a circuit configuration of the magnetic disk unit illustrated in FIG. 1.

DETAILED DESCRIPTION OF THE PREFERRED EMBODIMENTS

Hereinafter, preferred embodiments of the invention will be described in detail with reference to drawings.

First Embodiment

1. Configuration of Magnetic Disk Unit

First, referring to FIG. 1 and FIG. 2, a configuration of a magnetic disk unit according to a first embodiment of the invention will be described below.

Figure 1:
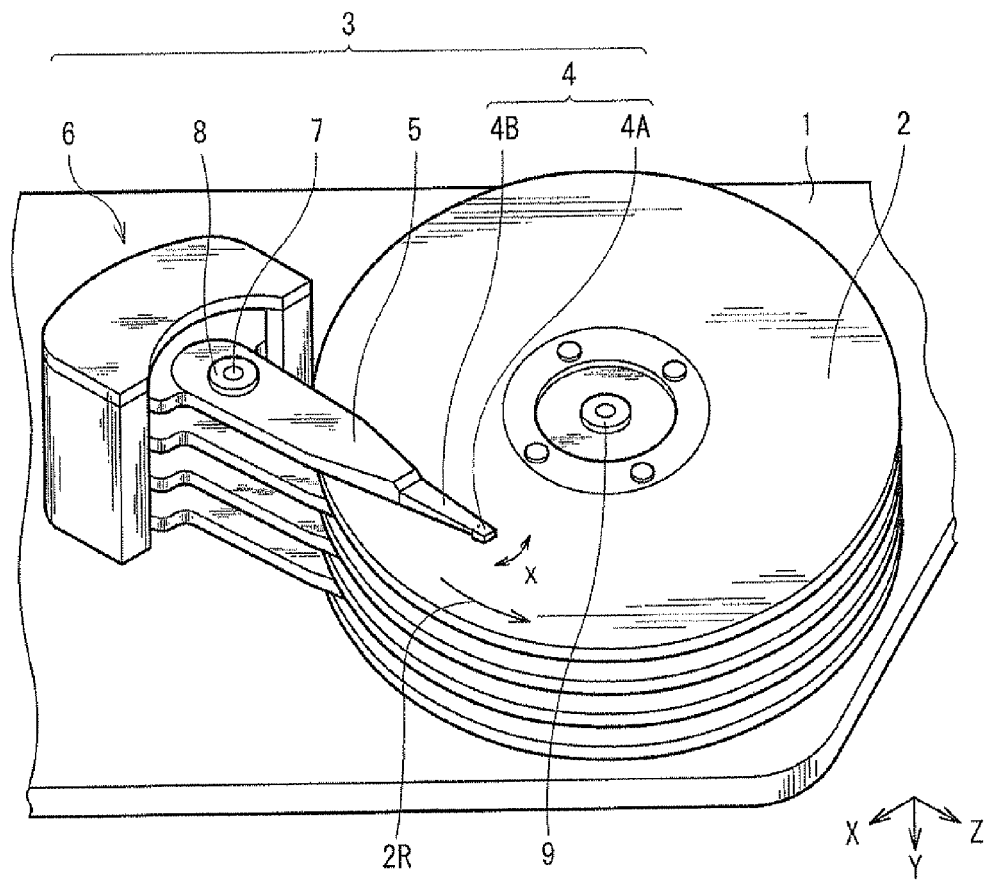
FIG. 1 is a perspective view illustrating a configuration of a magnetic disk unit provided with a magnetic read write head according to a first embodiment of the invention.

FIG. 1 is a perspective view illustrating an internal configuration of the magnetic disk unit as the present embodiment. The magnetic disk unit adopts a load-unload system as a driving system, and includes, for example, in a housing 1, a magnetic disk 2 as a magnetic recording medium in which information is to be written, and a Head Arm Assembly (HAA) 3 for writing information in the magnetic disk 2 and reading the information. The HAA 3 includes a Head Gimbals Assembly (HGA) 4, an arm 5 supporting a base of the HGA 4, and a driver 6 as a power source for allowing the arm 5 to pivot. The HGA 4 includes a thermally-assisted magnetic head device (hereinafter, simply referred to as a "magnetic head device") 4A having a side surface provided with a magnetic read write head 10 (described later) according to the present embodiment, and a suspension 4B having an end provided with the magnetic head device 4A. The arm 5, supports the other end of the suspension 4B (an end opposite to the end provided with the magnetic head device 4A). The arm 5 is so configured as to be pivotable, through a bearing 8, around a fixed shaft 7 fixed to the housing 1. The driver 6 is configured of, for example, a voice coil motor. Incidentally, the magnetic disk unit has one or a plurality of (FIG. 1 exemplifies the case of four) magnetic disks 2, and the magnetic head device 4A is disposed corresponding to recording surfaces (a front surface and a back surface) of each of the magnetic disks 2. Each of the magnetic head devices 4A is movable in a direction across write tracks, that is, in a track width direction (in an X-axis direction) in a plane parallel to the recording surface of each of the magnetic disks 2. On the other hand, the magnetic disk 2 rotates around a spindle motor 9 fixed to the housing 1 in a rotation direction 2R substantially orthogonal to the X-axis direction. With the rotation of the magnetic disk 2 and the movement of a slider 4A, information is written into the magnetic disk 2 or stored information is read out. Further, the magnetic disk unit has a control circuit (described later) that controls a write operation and a read operation of the magnetic read write head 10, and controls an emission operation of a laser diode as a light source that generates laser light used for thermally-assisted magnetic writing described later.

Figure 2:
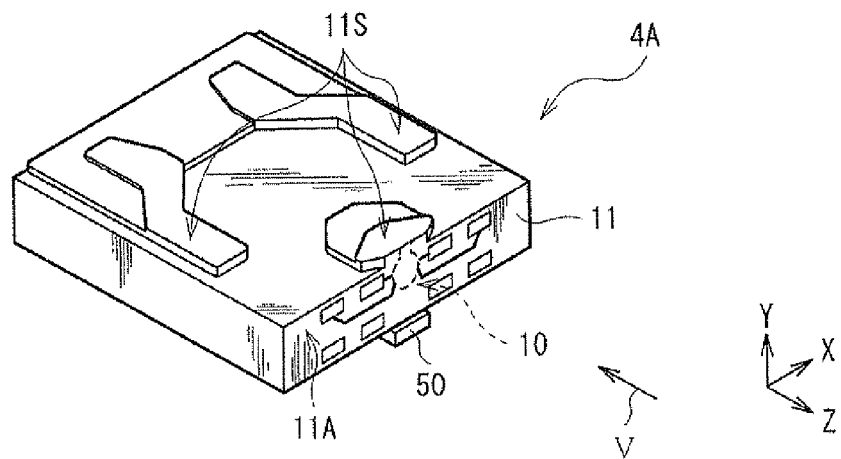
FIG. 2 is a perspective view illustrating a configuration of a slider in the magnetic disk unit illustrated in FIG. 1.

FIG. 2 illustrates a configuration of the magnetic head device 4A illustrated in FIG. 1. The magnetic head device 4A has a block-shaped slider 11 formed of, for example, $Al_2O_3$.TiC (AlTiC). The slider 11 is substantially formed as a hexahedron, for example, and one surface thereof corresponds to an ABS 11S that is disposed in proximity to and to face the recording surface of the magnetic disk 2. When the magnetic disk unit is not driven, namely, when the spindle motor 9 is stopped and the magnetic disk 2 does not rotate, the magnetic head device 4A is pulled off to the position away from the above part of the magnetic disk 2 (unload state), in order to prevent contact of the ABS 11S and the recording surface. In contrast, when the magnetic disk unit is initiated, the magnetic disk 2 starts to rotate at a high speed by the spindle motor 9, and the arm 5 is pivotably moved around the fixed shaft 7 by the driver 6. Therefore, the magnetic head device 4A moves above the front surface of the magnetic disk 2, and is in a load state. The rotation of the magnetic disk 2 at a high speed causes air flow between the recording surface and the ABS 11S, and lift force caused by the air flow leads to a state where the magnetic head device 4A floats to maintain a certain distance (magnetic spacing) along a direction (a Y-axis direction) orthogonal to the recording surface. In addition, on an element forming surface 11A that is one side surface orthogonal to the ABS 11S, the magnetic read write head 10 is provided. Incidentally, on a surface 11B opposite to the ABS 11S of the slider 11, a light source unit 50 is provided near the magnetic read write head 10.

2. Detailed Structure of Magnetic Read Write Head

Next, the magnetic read write head 10 is described in more detail with reference to FIG. 3 to FIG. 6.

Figure 3:
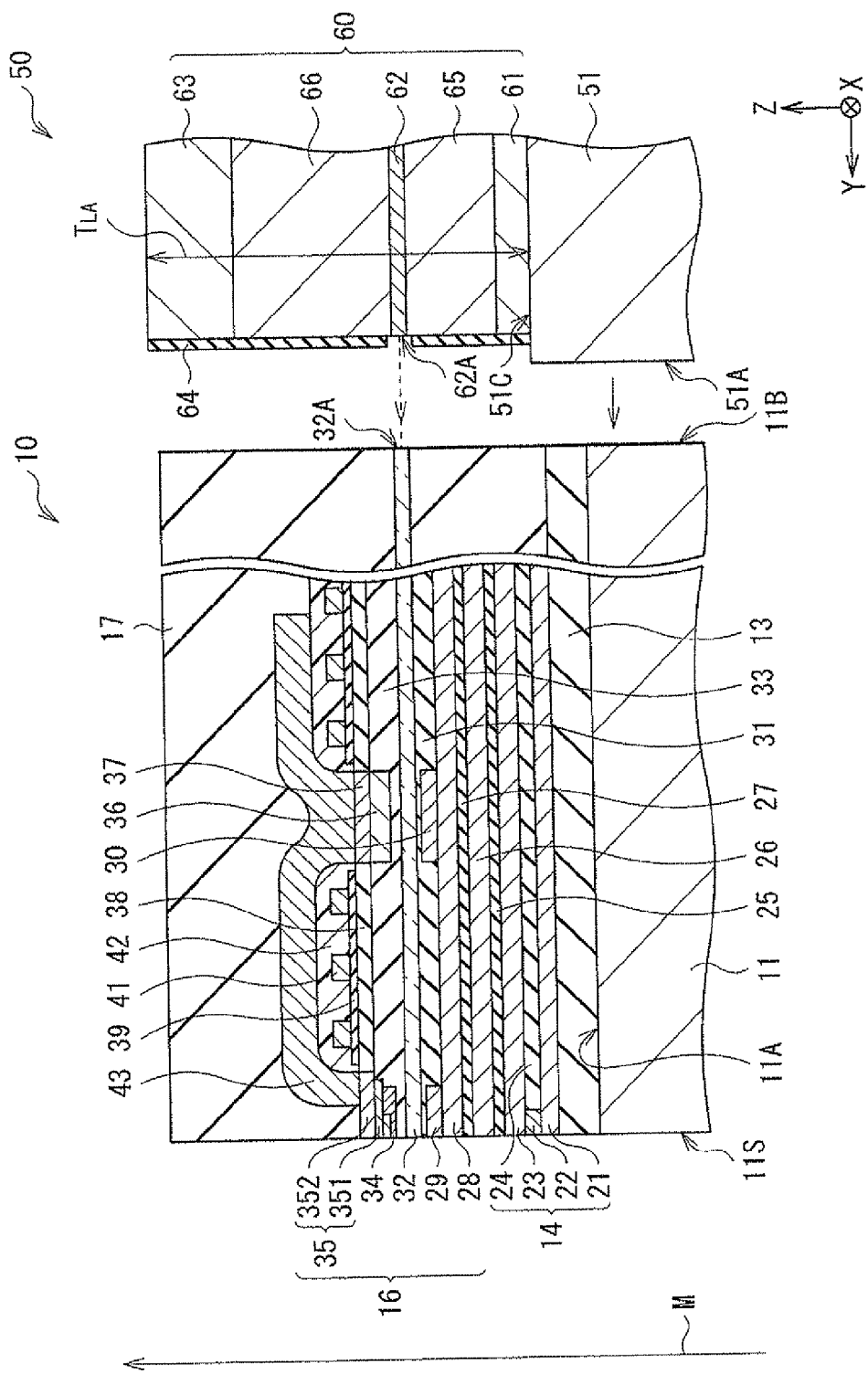
FIG. 3 is a sectional view illustrating a structure of a cross-sectional surface (an YZ cross-sectional surface) orthogonal to an air bearing surface in the magnetic read write head illustrated in FIG. 2.
Figure 4:
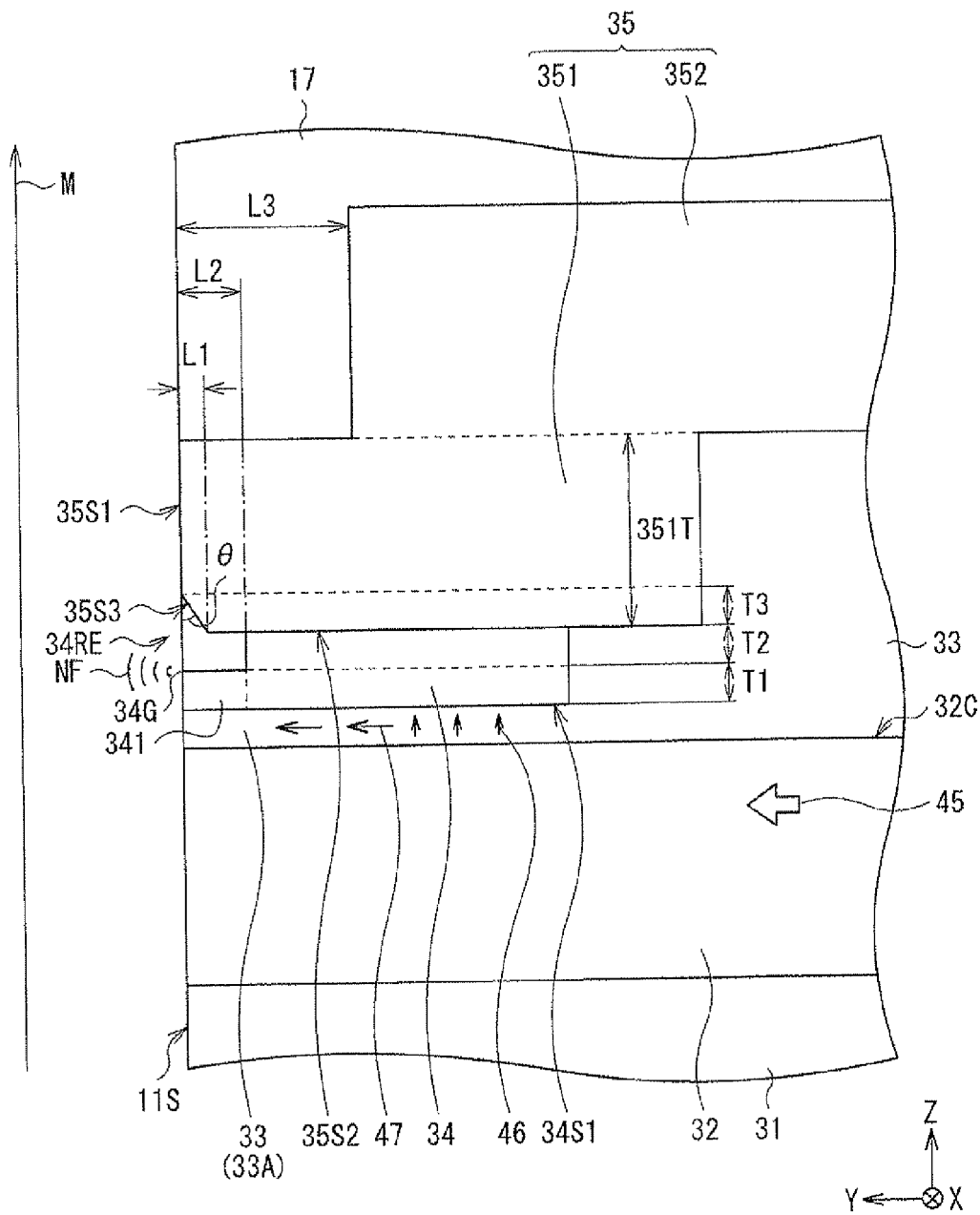
FIG. 4 is a sectional view illustrating a main part of the magnetic read write head illustrated in FIG. 3, in an enlarged manner.
Figure 5:
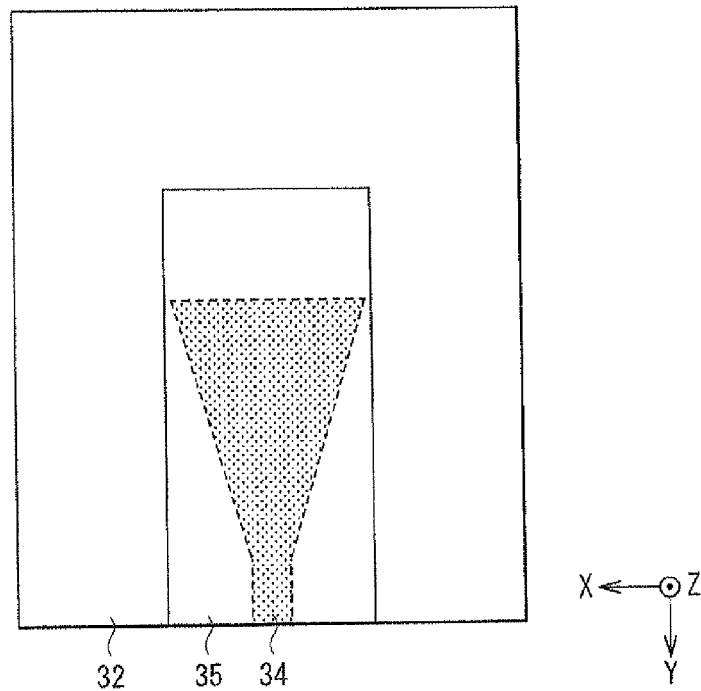
FIG. 5 is a schematic diagram illustrating a shape of an XY plane of the main part of the magnetic read write head.
Figure 6:
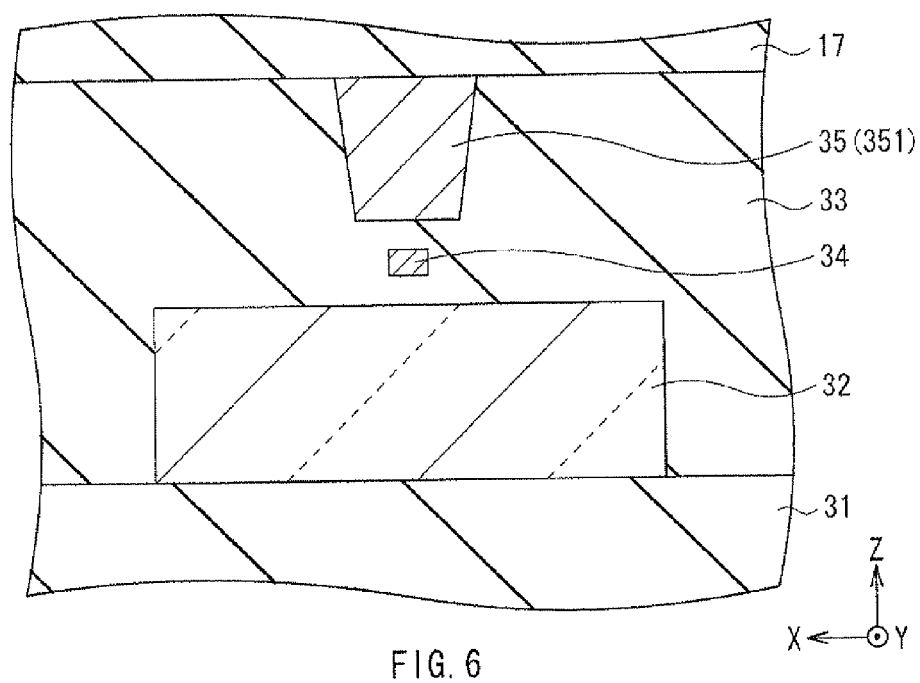
FIG. 6 is a schematic diagram illustrating a structure of an end surface exposed on the air bearing surface, in the main part of the magnetic read write head.

FIG. 3 is a sectional view of the magnetic read write head 10 illustrated in FIG. 2, in the Y-Z cross-sectional surface orthogonal to the ABS 11S, and FIG. 4 is an enlarged sectional view illustrating a part of FIG. 3. FIG. 5 is a schematic diagram illustrating a planar structure of a main part of the magnetic read write head 10 viewed from an arrow V direction illustrated in FIG. 2. FIG. 6 illustrates a part of an end surface exposed on the ABS 11S in an enlarged manner.

Note that an up-arrow M illustrated in FIG. 3 and FIG. 4 indicates a direction in which the magnetic disk 2 moves relative to the magnetic disk 2.

In the following description, dimensions in the X-axis direction, the Y-axis direction, and the Z-axis direction are referred to as a "width", a "height" or a "length", and a "thickness", respectively, and a closer side and a farther side to/from the ABS 11S in the Y-axis direction are referred to as "forward" and "backward", respectively. Moreover, forward and backward in the direction of the arrow M are referred to as a "trailing side" and a "leading side", respectively, and the X-axis direction and the Z-axis direction are referred to as a "cross track direction" and a "down track direction", respectively.

The magnetic read write head 10 has a stacked structure including an insulating layer 13, a read head section 14, a write head section 16, and a cladding layer 17 which are stacked in order on the slider 11. Each of the read head section 14 and the write head section 16 has an end surface exposed on the ABS 11S.

The read head section 14 uses magneto-resistive effect (MR) to perform a read process. The read head section 14 is configured by stacking, for example, a lower shield layer 21, an MR element 22, and an upper shield layer 23 in this order on the insulating layer 13.

The lower shield layer 21 and the upper shield layer 23 are respectively formed of a soft magnetic metal material such as NiFe (nickel iron alloy), and are disposed to face each other with the MR element 22 in between in the stacking direction (in the Z-axis direction). As a result, these layers each exhibit a function to protect the MR element 22 from the influence of an unnecessary magnetic field.

One end surface of the MR element 22 is exposed on the ABS 11S, and the other end surfaces thereof are in contact with an insulating layer 24 filling a space between the lower shield layer 21 and the upper shield layer 23. The insulating layer 24 is formed of an insulating material such as $Al_2O_3$ (aluminum oxide), AlN (aluminum nitride), $SiO_2$ (silicon dioxide), and DLC (diamond-like carbon).

The MR element 22 functions as a sensor for reading magnetic information written in the magnetic disk 2. Note that in the present embodiment, in a direction (the Y-axis direction) orthogonal to the ABS 11S, a direction toward the ABS 11S from the MR element 22 or a position near the ABS 11S is called a "front side", and a direction toward a side opposite to the ABS 11S from the MR element 22 or a position away from the ABS 11S is called a "back side". The MR element 22 is, for example, a CPP (Current Perpendicular to Plane)-GMR (Giant Magnetoresistive) element whose sense current flows inside thereof in a stacking direction. The lower shield layer 21 and the upper shield layer 23 each function as an electrode to supply the sense current to the MR element 22.

In the read head section 14 with such a structure, a magnetization direction of a free layer (not illustrated) included in the MR element 22 changes depending on a signal magnetic field from the magnetic disk 2. Thus, the magnetization direction of the free layer shows a change relative to a magnetization direction of a pinned layer (not illustrated) also included in the MR element 22. When the sense current flows through the MR element 22, the relative change of the magnetization direction appears as the change of the electric resistance, and thus, the signal magnetic field is detected with use of the change and the magnetic information is accordingly read out.

On the read head section 14, an insulating layer 25, an intermediate shield layer 26, and an insulating layer 27 are stacked in order. The intermediate shield layer 26 functions to prevent the MR element 22 from being affected by a magnetic field that is generated in the write head section 16, and is formed of, for example, a soft magnetic metal material such as NiFe. The insulating layers 25 and 27 are formed of the similar material to that of the insulating layer 24, for example.

The write head section 16 is a perpendicular magnetic write head performing a writing process of thermally-assisted magnetic writing system. The write head section 16 has, for example, a lower yoke layer 28, a leading shield 29 and a connecting layer 30, a cladding layer 31, a waveguide 32, and a cladding layer 33 in order on the insulating layer 27. Note that the leading shield 29 may be omitted from the structure.

The lower yoke layer 28, the leading shield 29, and the connecting layer 30 are each formed of a soft magnetic metal material such as NiFe. The leading shield 29 is located at the frontmost end of the upper surface of the lower yoke layer 28 in such a manner that one end surface thereof is exposed on the ABS 11S. The connecting layer 30 is located at the backward of the leading shield 29 on the upper surface of the lower yoke layer 28.

The cladding layer 31 is provided to cover the lower yoke layer 28, the leading shield 29, and the connecting layer 30.

The waveguide 32 provided on the cladding layer 31 extends in a direction (the Y-axis direction) orthogonal to the ABS 11S, one end surface thereof is exposed on the ABS 11S, and the other end surface thereof is exposed at the backward thereof, for example. Note that the front end surface of the waveguide 32 may be located at a position receded from the ABS 11S without being exposed on the ABS 11S. The waveguide 32 is formed of a dielectric material allowing laser light to pass therethrough. Specifically, the waveguide 32 may be formed of a material essentially containing one or more of, for example, SiC, DLC, TiOx (titanium oxide), TaOx (tantalum oxide), SiNx (silicon nitride), $SiO_xN_y$ (silicon oxynitride), Si (silicon), zinc selenide (ZnSe), NbOx (niobium oxide), GaP (gallium phosphide), ZnS (zinc sulfide), ZnTe (zinc telluride), CrOx (chromium oxide), FeOx (iron oxide), CuOx (copper oxide), SrTiOx (strontium titanate), BaTiOx (barium titanate), Ge (germanium), and C (diamond). Essentially containing means that the above-described materials are contained as main components, and other materials may be contained as subcomponents (for example, impurity) as long as having a refractive index higher than those of the cladding layers 31 and 33. The waveguide 32 allows laser light from a laser diode 60 (described later) to propagate toward the ABS 11S. Incidentally, although the cross-sectional shape parallel to the ABS 11S of the waveguide 32 is a rectangular as illustrated in FIG. 6, for example, it may have other shapes.

The cladding layers 31 and 33 are each formed of a dielectric material having a refractive index, with respect to laser light propagating through the waveguide 32, lower than that of the waveguide 32. The cladding layers 31 and 33 may be formed of a material essentially (substantially) containing one or more of, for example, SiOx (silicon oxide), $Al_2O_3$ (aluminum oxide), AlN (aluminum nitride), BeO (berylium oxide), SiC (silicon carbide), and DLC (diamond-like carbon). Essentially containing means that the above-described materials are contained as main components, and the other materials may be contained as subcomponents (for example, impurity) as long as having a refractive index lower than that of the waveguide 32.

The write head section 16 further includes a plasmon generator 34 provided above the front end of the waveguide 32 with the cladding layer 33 in between, and a magnetic pole 35 provided above the plasmon generator 34.

The plasmon generator 34 is disposed in such a manner that one end surface of the front end 341 is exposed on the ABS 11S. A recessed section 34RE recessed from the ABS 11S by a length L2 is provided in the plasmon generator 34. Therefore, the front end 341 of the plasmon generator 34 is surrounded by the cladding layer 33, and is away from the waveguide 32 and the front end of the magnetic pole 35. The material of the plasmon generator 34 may be a conductive material containing one or more of, for example, Pd (palladium), Pt (platinum), Rh (rhodium), Ir (iridium), Ru (ruthenium), Au (gold), Ag (silver), Cu (copper), and aluminum (Al). Note that the cross-sectional shape of the plasmon generator 34 parallel to the ABS 11S is rectangular as illustrated in FIG. 6, for example, however, it may have other shapes. In addition, the front end 341 has, for example, a thickness T1 of 10 nm or more and 80 nm or less, and the length L2 of 40 nm or more and 150 nm or less. Moreover, a gap between the front end 341 and a counter surface 35S2 of the magnetic pole 35, namely, a thickness T2 of the recessed section 34RE is, for example, 10 nm or more and 50 nm or less.

The magnetic pole 35 has a structure in which a first layer 351 and a second layer 352 are stacked in order on the plasmon generator 34. The first layer 351 has an end surface 35S1 exposed on the air bearing surface, the counter surface 35S2 facing the plasmon generator 34, and an inclined surface 35S3 connecting the end surface 35S1 and the counter surface 35S2. It is desirable that an angle θ of the inclined surface 35S3 with respect to the ABS 11S be, for example, larger than 0° and 60° or less, preferably 45° or less, and more preferably, 30° or less. An intersection of the counter surface 35S2 and the inclined surface 35S3 is a position away from the ABS 11S by a length L1 (<L2). In addition, the second layer 352 extends backward from a position recessed from the ABS 11S by a length L3 (>L2).

A distance from the intersection of the inclined surface 35S3 and the counter surface 35S2 up to the intersection of the inclined surface 35S3 and the end surface 35S1 in the Z-axis direction, namely, a thickness T3 is, for example, 50 nm or more and 250 nm or less.

Both the first layer 351 and the second layer 352 are formed of a magnetic material with high saturation flux density such as iron-based alloy. Examples of the iron-based alloy include FeCo (iron cobalt alloy), FeNi (iron nickel alloy), and FeCoNi (iron cobalt nickel alloy). Incidentally, although a cross-sectional shape of the first layer 351 parallel to the ABS 11S is an inverted trapezoid as illustrated in FIG. 6, for example, it may have other shapes.

The plasmon generator 34 generates near-field light NF (described later) from the ABS 11S, based on the laser light which has propagated through the waveguide 32. The magnetic pole 35 stores therein magnetic flux generated in a coil 41 (described later), and releases the magnetic flux from the ABS 11S, thereby generating a recording magnetic field for writing magnetic information into the magnetic disk 2. The plasmon generator 34 and the first layer 351 are embedded in the cladding layer 33.

The write head section 16 further includes a connecting layer 36 embedded in the cladding layer 33 at the backward of the plasmon generator 34 and the magnetic pole 35, and a connecting layer 37 provided to be in contact with an upper surface of the connecting layer 36. The connecting layers 36 and 37 are located above the connecting layer 30 and are formed of a soft magnetic metal material such as NiFe. Note that the connecting layer 36 is magnetically connected by a connection section (not illustrated) formed of, for example, a soft magnetic metal material such as NiFe.

As illustrated in FIG. 3, on the cladding 33, an insulating layer 38 is provided to fill surroundings of the second layer 352 of the magnetic pole 35. An insulating layer 39 and the coil 41 that is formed in spiral around the connecting layer 37 are stacked in order on the insulating layer 38. The coil 41 generates recording-use magnetic flux by a write current flowing through itself, and is formed of a high conductive material such as Cu (copper) and Au (gold). The insulating layers 38 and 39 are formed of an insulating material such as $Al_2O_3$, AlN, $SiO_2$ and DLC. The insulating layer 38, the insulating layer 39, and the coil 41 are covered with an insulating layer 42, and further, an upper yoke layer 43 is so provided as to cover the insulating layer 42. The insulating layer 42 is formed of, for example, a non-magnetic insulating material flowing on heating, such as a photoresist or a spin on glass (SOG). The insulating layers 38, 39, and 42 electrically separate the coil 41 from its surroundings. The upper yoke layer 43 is formed of a soft magnetic material with high saturation flux density such as CoFe, the forward section thereof is connected to the second layer 352 of the magnetic pole 35, and a part of the backward section is connected to the connecting layer 37. In addition, the front end surface of the upper yoke layer 43 is located at a position receded from the ABS 11S.

In the write head section 16 having such a structure, by the write current flowing through the coil 41, magnetic flux is generated inside a magnetic path that is mainly configured by the leading shield 29, the lower yoke layer 28, the connecting layers 30, 36, and 37, the upper yoke layer 43, and the magnetic pole 35. Accordingly, a signal magnetic field is generated near the end surface of the magnetic pole 35 exposed on the ABS 11S, and the signal magnetic field reaches a predetermined region of the recording surface of the magnetic disk 2.

Further, in the magnetic read write head 10, for example, the cladding layer 17 formed of a material similar to that of the cladding layer 33 is formed to cover the entire upper surface of the write head section 16. In other words, the cladding layer 33 and the cladding layer 17 that are each formed of a material having a lower refractive index compared with the waveguide 32 and high thermal conductivity are so provided as to collectively surround the waveguide 32, the plasmon generator 34, and the magnetic pole 35.

The light source unit 50 provided at the backward of the magnetic read write head 10 includes the laser diode 60 as a light source emitting laser light, and, for example, a rectangular-solid supporting member 51 supporting the laser diode 60, as illustrated in FIG. 3.

The supporting member 51 is formed of, for example, a ceramic material such as $Al_2O_3.TiC$. As illustrated in FIG. 4, the supporting member 51 includes a bonded surface 51A to be bonded to a back surface 11B of the slider 11, and a light source mounting surface 51C orthogonal to the bonded surface 51A. The light source mounting surface 51C is parallel to the element forming surface 11A. The laser diode 60 is mounted on the light source mounting surface 51C. The supporting member 51 desirably has a function of a heatsink dissipating heat generated by the laser diode 60, in addition to the function to support the laser diode 60.

Laser diodes generally used for communication, for optical disc storage, or for material analysis, for example, InP-based, GaAs-based, or GaN-based one may be used as the laser diode 60. The wavelength of the laser light emitted from the laser diode 60 may be any value within the range of, for example, 375 nm to 1.7 μm. Specifically, it may be a laser diode of InGaAsP/InP quaternary mixed crystal with the emission wavelength region of 1.2 to 1.67 μm. As illustrated in FIG. 3, the laser diode 60 has a multilayer structure including a lower electrode 61, an active layer 62, and an upper electrode 63. For example, an n-type semiconductor layer 65 including n-type AlGaN is interposed between the lower electrode 61 and the active layer 62, and for example, a p-type semiconductor layer 66 including p-type AlGaN is interposed between the active layer 62 and the upper electrode 63. On each of two cleavage surfaces of the multilayer structure, a reflective layer 64 formed of $SiO_2$, $Al_2O_3$, or the like is provided to totally reflect light and excite oscillation. In the reflective layer 64, an opening for emitting laser light is provided at a position including an emission center 62A of the active layer 62. The relative positions of the light source unit 50 and the magnetic read write head 10 are fixed by bonding the bonded surface 51A of the supporting member 51 to the back surface 11B of the slider 11 in such a manner that the emission center 62A and the rear end surface 32A of the waveguide 32 are coincident with each other. The thickness $T_{LA}$ of the laser diode 60 is, for example, about 60 to 200 μm. When a predetermined voltage is applied between the lower electrode 61 and the upper electrode 63, laser light is emitted from the emission center 62A of the active layer 62, and then enters the rear end surface 32A of the waveguide 32. The laser light emitted from the laser diode 60 is preferably polarized light of a TM mode whose electric field oscillates in a direction perpendicular to the surface of the active layer 62. The laser diode 60 may be driven with use of a power source in the magnetic disk unit. The magnetic disk unit generally includes a power source generating a voltage of about 2 V, for example, and the voltage generated by the power source is sufficient to drive the laser diode 60. In addition, the laser diode 60 consumes power of, for example, about several tens mW, which is sufficiently covered by the power source in the magnetic disk unit.

3. Control Circuit of Magnetic Disk Unit and Operation

Referring to FIG. 7, the circuit configuration of the control circuit of the magnetic disk unit illustrated in FIG. 1 and the operation of the magnetic read write head 10 will be described below. The control circuit includes a control LSI (large-scale integration) 100, a ROM (read only memory) 101 connected to the control LSI 100, a write gate 111 connected to the control LSI 100, and a write circuit 112 connecting the write gate 111 to the coil 41. The control circuit further includes a constant current circuit 121 connected to the MR element 22 and the control LSI 100, an amplifier 122 connected to the MR element 22, and a demodulation circuit 123 connected to the output end of the amplifier 122 and the control LSI 100. The control circuit further includes a laser control circuit 131 connected to the laser diode 60 and the control LSI 100, and a temperature detector 132 connected to the control LSI 100.

Here, the control LSI 100 provides write data and a write control signal to the write gate 111. Moreover, the control LSI 100 provides a read control signal to the constant current circuit 121 and the demodulation circuit 123, and receives read data output from the demodulation circuit 123. In addition, the control LSI 100 provides a laser ON/OFF signal and an operation current control signal to the laser control circuit 131.

The temperature detector 132 detects the temperature of the magnetic recording layer of the magnetic disk 2 to transmit information of the temperature to the control LSI 100.

The ROM 101 holds a control table and the like to control an operation current value to be supplied to the laser diode 60.

At the time of write operation, the control LSI 100 supplies the write data to the write gate 111. The write gate 111 supplies the write data to the write circuit 112 only when the write control signal instructs to perform the write operation. The write circuit 112 allows the write current to flow through the coil 41 according to the write data. As a result, a write magnetic field is generated from the magnetic pole 35, and data is written into the magnetic recording layer of the magnetic disk 2 by the write magnetic field.

At the time of read operation, the constant current circuit 121 supplies a constant sense current to the MR element 22 only when the read control signal instructs to perform the read operation. The output voltage of the MR element 22 is amplified by the amplifier 122, and is then received by the demodulation circuit 123. The demodulation circuit 123 demodulates the output of the amplifier 122 to generate read data to be provided to the control LSI 100 when the read control signal instructs to perform the read operation.

The laser control circuit 131 controls the supply of the operation current to the laser diode 60 based on the laser ON/OFF signal, and controls the value of the operation current supplied to the laser diode 60 based on the operation current control signal. The operation current equal to or larger than an oscillation threshold is supplied to the laser diode 60 by the control of the laser control circuit 131 when the laser ON/OF signal instructs to perform the ON operation. As a result, the laser light is emitted from the laser diode 60 and then the laser light propagates through a core 32. Subsequently, the near-field light NF (described later) is generated from the tip section 34G of the plasmon generator 34, a part of the magnetic recording layer of the magnetic disk 2 is heated by the near-field light NF, and thus the coercivity in that part is lowered. At the time of writing, the write magnetic field generated from the magnetic pole 35 is applied to the part of the magnetic recording layer with lowered coercivity, and therefore data recording is performed.

The control LSI 100 determines a value of the operation current of the laser diode 60 with reference to the control table stored in the ROM 101, based on the temperature and the like of the magnetic recording layer of the magnetic disk 2 measured by the temperature detector 132, and controls the laser control circuit 131 with use of the operation current control signal in such a manner that the operation current of the value is supplied to the laser diode 60. The control table includes, for example, the oscillation threshold of the laser diode 60 and data indicating temperature dependency of light output-operation current property. The control table may further include data indicating a relationship between the operation current value and the increased amount of the temperature of the magnetic recording layer heated by the near-field light NF, and data indicating temperature dependency of the coercivity of the magnetic recording layer.

The control circuit illustrated in FIG. 7 has a signal system to control the laser diode 60, that is, a signal system of, the laser ON/OFF signal and the operation current control signal, independent of the control signal system of write-read operation, and therefore, more various conduction modes to the laser diode 60 are achievable, in addition to the conduction to the laser diode 60 simply operated in conjunction with the write operation. Note that the configuration of the control circuit of the magnetic disk unit is not limited to that illustrated in FIG. 7.

Subsequently, a principle of near-field light generation in the present embodiment and a principle of thermally-assisted magnetic writing with use of the near-field light will be described with reference to FIG. 4.

Laser light 45 which has been emitted from the laser diode 60 propagates through the waveguide 32 to reach near the plasmon generator 34. At this time, the laser light 45 is totally reflected by an evanescent light generating surface 32C that is an interface between the waveguide 32 and a buffer section 33A (a section between the waveguide 32 and the plasmon generator 34, of the cladding layer 33), and therefore evanescent light 46 leaking into the buffer section 33A is generated. After that, the evanescent light 46 couples with charge fluctuation on a surface plasmon exciting surface 34S 1 facing the waveguide 32, of the plasmon generator 34 to induce a surface plasmon polariton mode. As a result, surface plasmons 47 are excited on the surface plasmon exciting surface 34S 1.

The surface plasmons 47 propagate on the surface plasmon exciting surface 34S1 toward the ABS 11.

The surface plasmons 47 eventually reach the ABS 11S, and as a result, the near-field light NF is generated on the tip section 34G. The near-field light NF is irradiated toward the magnetic disk 2 (not illustrated in FIG. 4) and reaches the surface of the magnetic disk 2 to heat a part of the magnetic recording layer of the magnetic disk 2. As a result, the coercivity at the heated part of the magnetic recording layer is lowered. In the thermally-assisted magnetic writing, with respect to the part of the magnetic recording layer with the coercivity thus lowered, data writing is performed by application of the write magnetic field generated by the magnetic pole 35.

4. Effects

In the magnetic read write head 10 of the present embodiment, as described above, the first layer 351 of the magnetic pole 35 has the inclined surface 35S3 connecting the end surface 35S1 exposed on the ABS 11S and the counter surface 35S2 facing the plasmon generator 34. Therefore, distribution of a recording magnetic field released from the first layer 351 becomes gentle along the air bearing surface (the gradient of the magnetic field becomes gentle). Specifically, the intensity of the magnetic field at a position to be a heat spot facing the plasmon generator 34 is increased while the intensity of the magnetic field at a peak position facing the magnetic pole 35 is decreased, and difference therebetween is accordingly decreased. As a result, when the region where magnetic information has been written (the recorded region) passes through the position facing (the first layer 351 of) the magnetic pole 35, the recorded region is not overwritten unintentionally. Therefore, magnetic recording with high density is allowed to be performed accurately.

Second Embodiment

1. Structure of Magnetic Read Write Head

Figure 8:
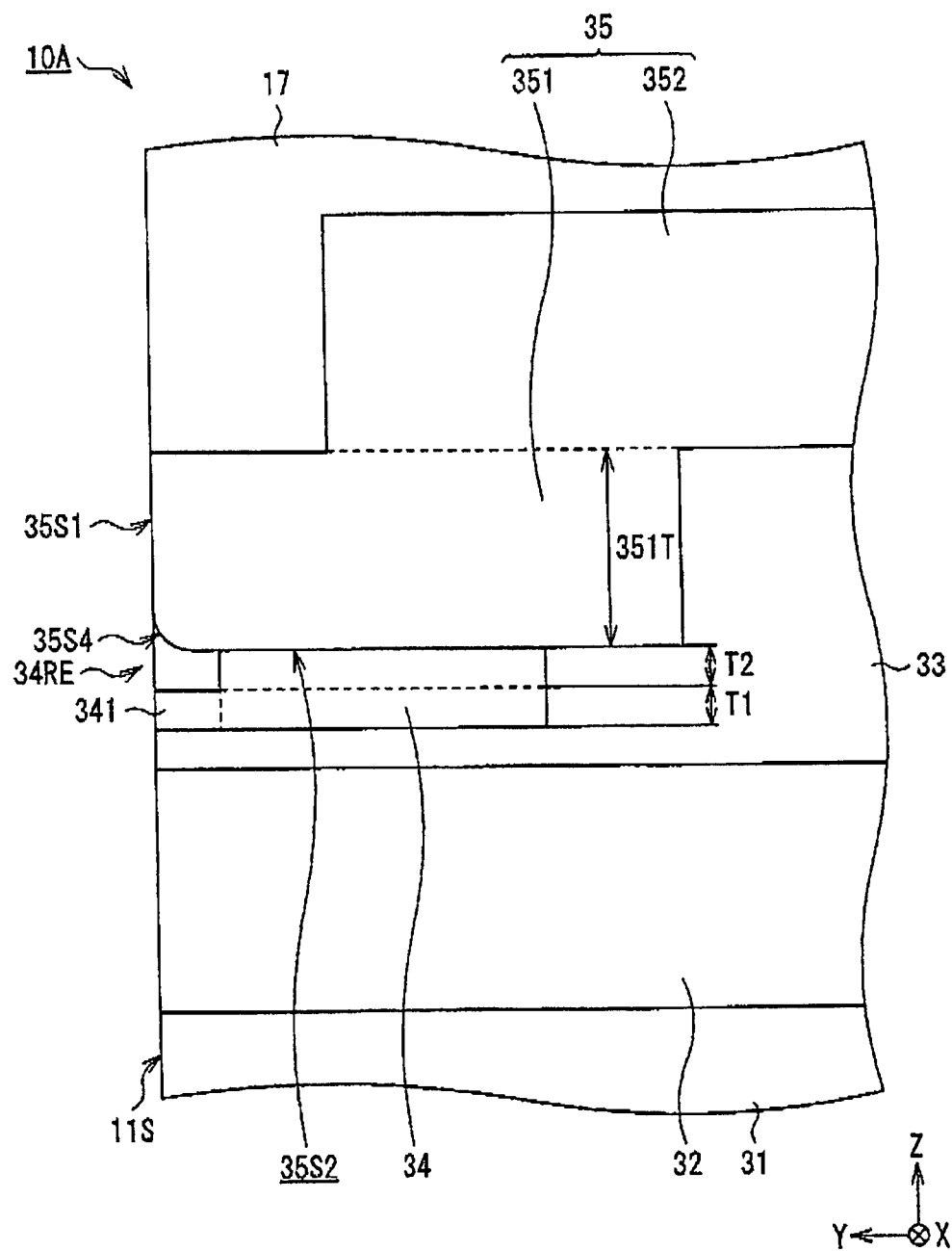
FIG. 8 is an enlarged sectional view illustrating a structure of a main part of a magnetic read write head according to a second embodiment of the invention.

Next, a magnetic read write head 10A according to a second embodiment of the invention is described with reference to FIG. 8. FIG. 8 is an enlarged sectional view illustrating a structure of a main part of the magnetic read write head 10A. The magnetic read write head 10A is similar to the above-described first embodiment except that a cross-sectional shape of the front end of the first layer 351 of the magnetic pole 35 is different. Therefore, the cross-sectional shape of the front end will be described below, and other description will be appropriately omitted.

In the magnetic read write head 10 of the first embodiment, the end surface 35S1 and the counter surface 35S2 are connected by the inclined surface 35S3 formed of a flat surface. In contrast, in the magnetic read write head 10A of the present embodiment, the end surface 35S1 and the counter surface 35S2 are connected by a curved surface 35S4. The curved surface 35S4 has a radius of curvature satisfying, for example, $0<r\leq 100$ nm on the cross-sectional surface (the YZ surface) orthogonal to the ABS 11S.

2. Effects

Also in the magnetic read write head 10A with such a structure, similarly to the magnetic read write head 10 (FIG. 4) of the above-described first embodiment, magnetic recording with high density is allowed to be performed accurately. Furthermore, in the magnetic read write head 10A of the present embodiment, compared with the magnetic read write head 10 (FIG. 4), intensity distribution of the recording magnetic field is made more flat, and SNR (signal to noise ratio) is improved.

EXAMPLES

Examples of the invention will be described in detail.

1. Improvement in Distribution of Recording Magnetic Field

Experiment 1-1

Figure 9:
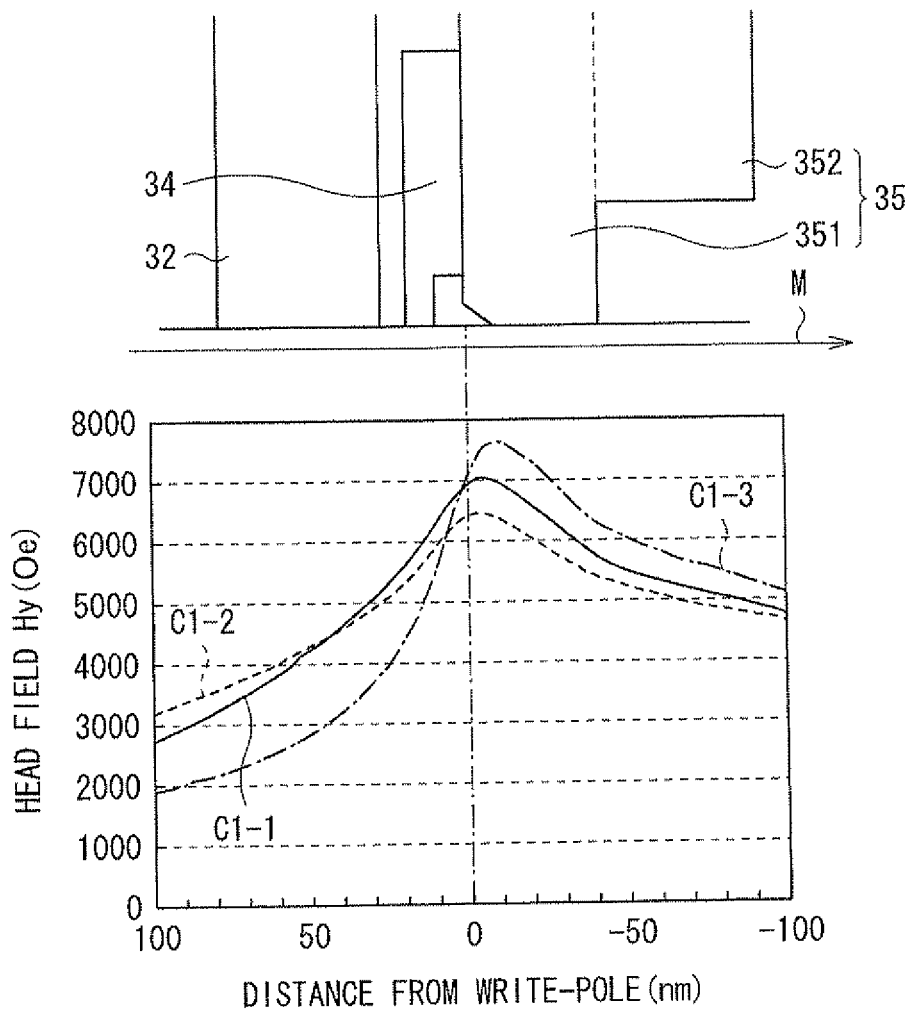
FIG. 9 is a characteristic diagram illustrating an intensity distribution of a recording magnetic field near an end surface of a magnetic pole in Experiments 1-1 and 1-2.

With respect to the magnetic read write head 10 of the above-described first embodiment illustrated in FIG. 2 to FIG. 6, etc., the intensity distribution of the recording magnetic field generated near the end surface 35S1 (of the first layer 351) of the magnetic pole 35 at the time when a constant write current flowed through the coil 41 was determined by simulation based on a finite element method. In this example, the angle θ was 45°, and the distance L1 and the thickness T3 were both 50 nm. In addition, a thickness 351T of the first layer 351 was 250 nm, and the thicknesses T1 and T2 were 40 nm and 20 nm, respectively. The result is illustrated by a curved line C1-1 in a lower part of FIG. 9. In FIG. 9, the horizontal axis indicates a position in the Z-axis direction along the ABS 11S, more specifically, a position in the Z direction in the case where a position where the counter surface 35S2, if being extended, intersects with the ABS 11S is referred to as 0 (zero). In this example, the direction toward the plasmon generator 34 from the magnetic pole 35 along the Z-axis is positive, and the direction toward the magnetic pole 35 from the plasmon generator 34 is negative. The outline of the main part of the magnetic read write head 10 is illustrated in an upper part of FIG. 9 to reveal a relative positional relationship with the horizontal axis (the position in the Z-axis direction) of the characteristic diagram in the lower part of FIG. 9. In addition, the vertical axis of FIG. 9 indicates intensity of the recording magnetic field. Note that a right arrow M in the drawings of FIG. 9 and FIG. 11 described later indicates a direction where the magnetic disk 2 moves relative to the magnetic read write head 10.

Experiment 1-2

As Experiment 1-2, with respect to the magnetic read write head 10 having the structure similar to that of the Experiment 1-1 except that the distance L1 and the thickness T3 were both 100 nm, the intensity distribution of the recording magnetic field under a condition similar to that of the Experiment 1-1 was determined by similar simulation. The result is illustrated by a curved line C1-2 in FIG. 9.

Experiment 1-3

Figure 10:
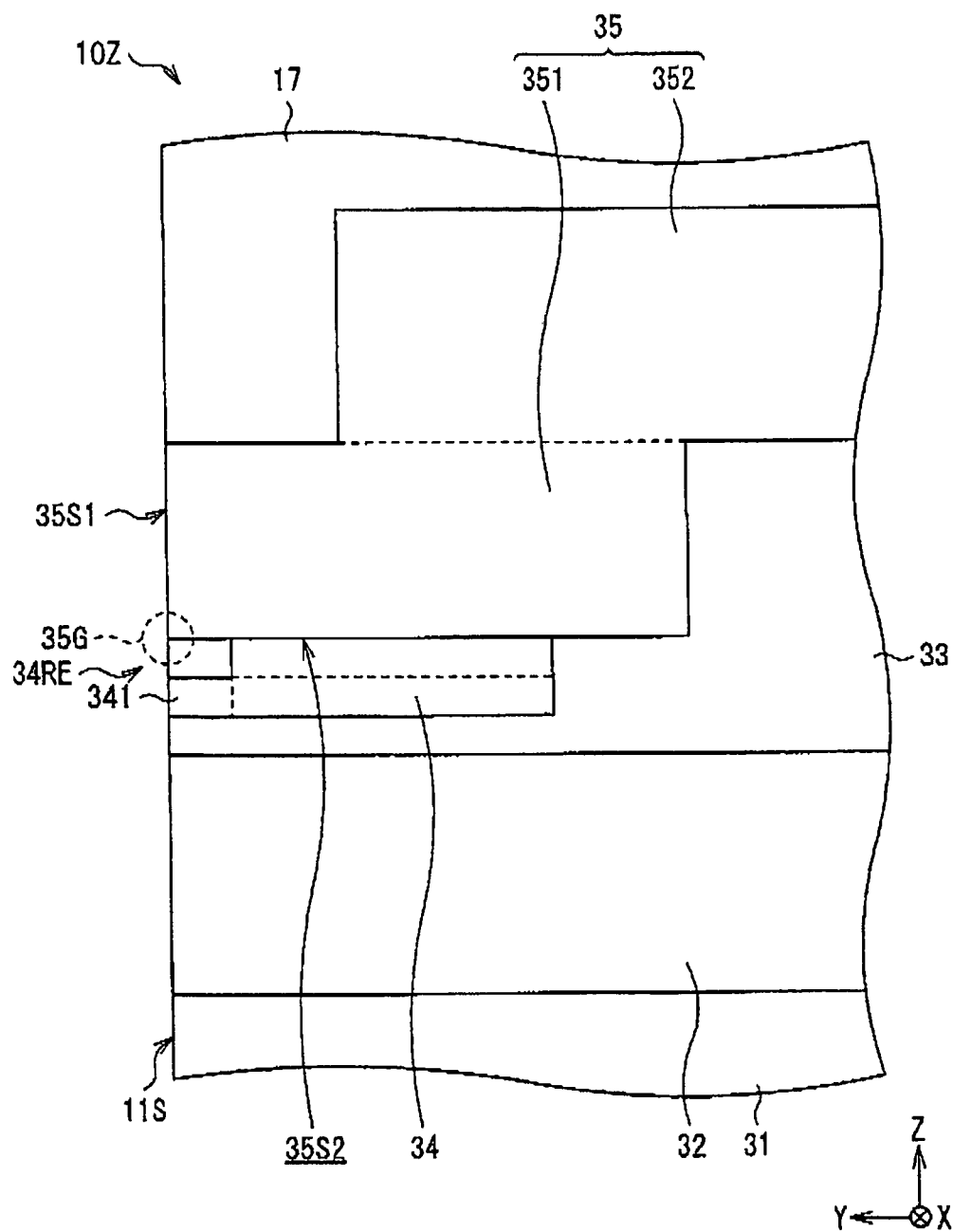
FIG. 10 is an enlarged sectional view illustrating a structure of a main part of a magnetic read write head according to a comparative example.

With respect to a magnetic read write head 10Z according to a comparative example illustrated in FIG. 10, a distribution of a write magnetic field generated near the end surface 35S1 (of the first layer 351) of the magnetic pole 35 at the time when a constant write current flowed through the coil 41 was determined by simulation based on a finite element method. The result is illustrated by a curved line C1-3 in FIG. 9. Note that the magnetic read write head 10Z of FIG. 10 is similar to the magnetic read write head 10A of the above-described first embodiment except that the front end of the first layer 351 of the magnetic pole 35 has a different cross-sectional shape. In the magnetic read write head 10Z, the end surface 35S1 intersects directly with the counter surface 35S2 without other flat surface or other curved surface in between, and an edge 35G is formed.

Experiment 1-4

As Experiment 1-4, with respect to the magnetic read write head 10A of the above-described second embodiment illustrated in FIG. 8, the intensity distribution of the recording magnetic field was determined similarly to the Experiment 1-1 by similar simulation. The result is illustrated by a curved line C1-4 in FIG. 11. Incidentally, in FIG. 11, the result of the Experiment 1-3 (the curved line C1-3) of the above-described comparative example is illustrated together. In this example, the radius of curvature on the YZ cross-section orthogonal to the ABS 11S, of the curved surface 35S4 (of the first layer 351) of the magnetic pole 35 was 50 nm. In addition, the thickness 351T of the first layer 351 was 250 nm, and the thicknesses T1 and T2 were 40 nm and 20 nm, respectively. The outline of the main part of the magnetic read write head 10A is illustrated in an upper part of FIG. 11 to reveal a relative positional relationship with the horizontal axis (the position in the Z-axis direction) of the characteristic diagram in a lower part of FIG. 11.

Experiment 1-5

As Experiment 1-5, with respect to the magnetic read write head 10A having the structure similar to that of the Experiment 1-4 except that the radius of curvature of the curved surface 35S4 (of the first layer 351) of the magnetic pole 35 was 100 nm, the intensity distribution of the recording magnetic field under a condition similar to that of the Experiment 1-4 was determined by similar simulation. The result is illustrated by a curved line C1-5 in FIG. 11.

Figure 11:
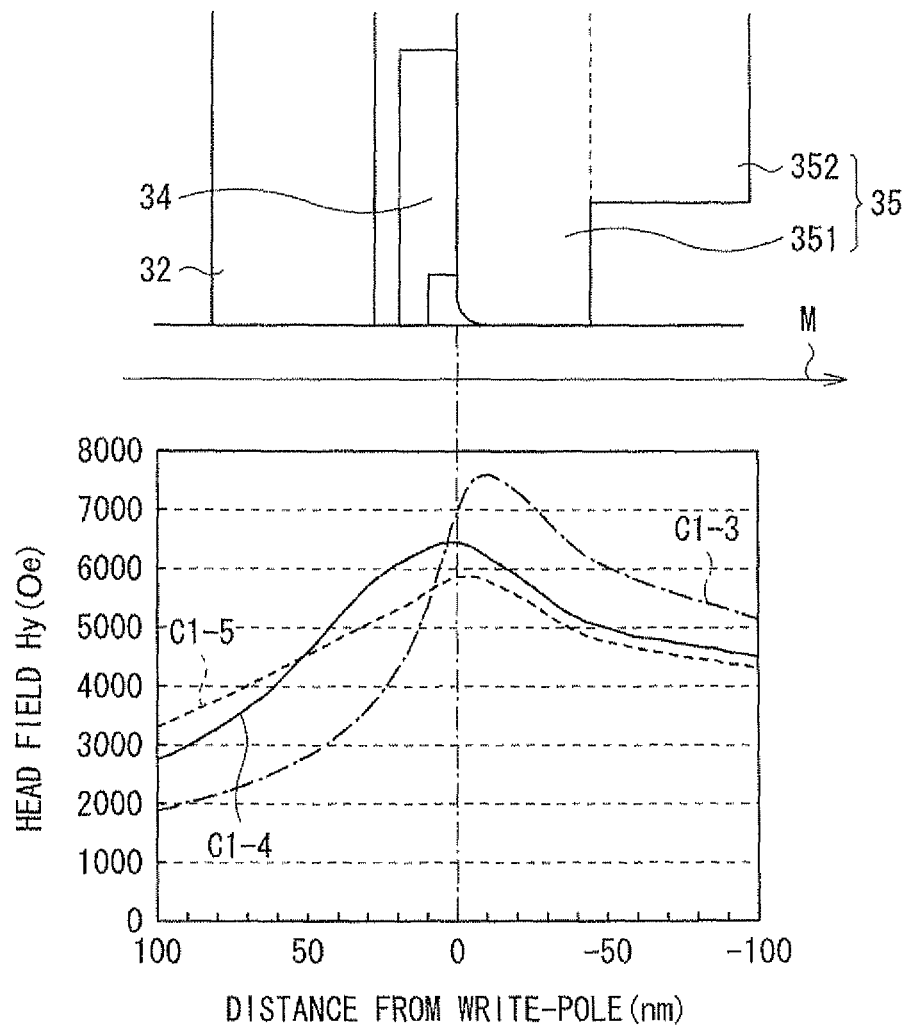
FIG. 11 is a characteristic diagram illustrating an intensity distribution of a recording magnetic field near an end surface of a magnetic pole in Experiments 1-4 and 1-5.

As apparent from the results of FIG. 9 and FIG. 11, in the Experiments 1-1, 1-2, 1-4, and 1-5 corresponding to the invention, steepness of the intensity distribution of the recording magnetic field becomes gentle, and the intensity of the recording magnetic field shows a moderate change in the Z-axis direction, compared with the Experiment 1-3 of the comparative example. Specifically, the intensity of the magnetic field at a position to be a heat spot facing the plasmon generator 34 is increased while the intensity of the magnetic field at a peak position facing the magnetic pole 35 is decreased, and difference therebetween is accordingly decreased. As a result, it was confirmed that the magnetic read write head of the invention avoids unintentional overwriting to the recorded region, and is suitable for accurately performing magnetic recording with high density.

2. Improvement of SNR

Figure 12:
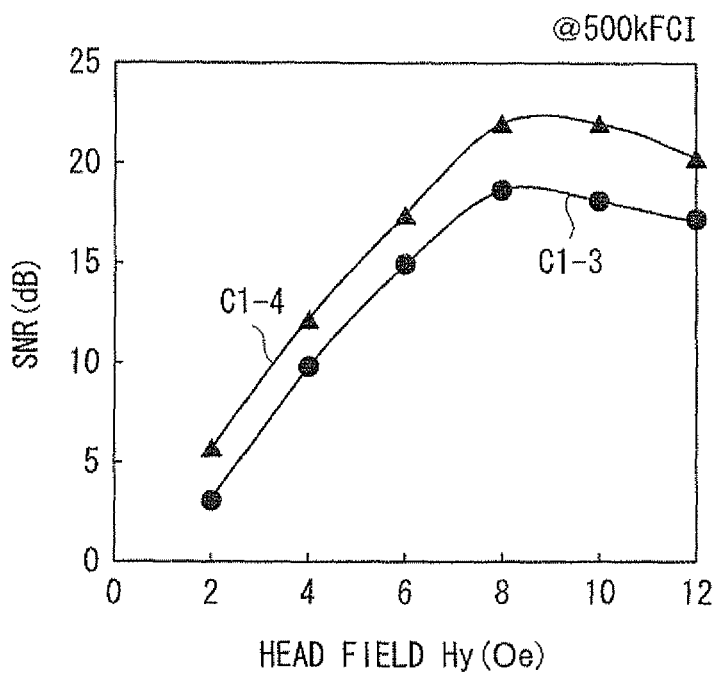
FIG. 12 is a characteristic diagram illustrating a relationship between the intensity of the recording magnetic field and SNR in the Experiment 1-4.

Next, with respect to the above-described Experiment 1-3 and the above-described Experiment 1-4, intensity dependence of the recording magnetic field of SNR were determined by simulation. The results are illustrated by the curved line C1-3 and the curved line C1-4 in FIG. 12. In FIG. 12, the horizontal axis indicates intensity of the recording magnetic field, and the vertical axis indicates SNR. Incidentally, FIG. 12 illustrates SNR characteristics in linear recording density of 500 k FCI. Likewise, FIG. 13 illustrates SNR characteristics in linear recording density of 1500 k FCI in the Experiment 1-3 and the Experiment 1-4.

Figure 13:
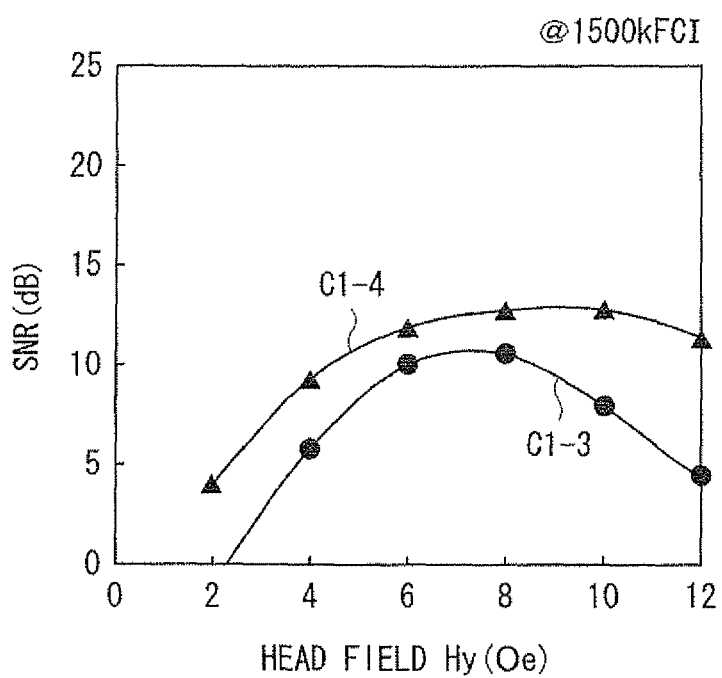
FIG. 13 is another characteristic diagram illustrating a relationship between the intensity of the recording magnetic field and the SNR in the Experiment 1-4.

As illustrated in FIG. 12 and FIG. 13, it was confirmed that the SNR in the Experiment 1-4 exceeds the SNR in the Experiment 1-3 by about 2 to 3 dB in either intensity of the recording magnetic field. This is conceivably because the intensity of the magnetic field at a position to be a heat spot in the Experiment 1-4 is increased compared with that in the Experiment 1-3.

Moreover, in the Experiment 1-3, the SNR in high recording density (1500 k FCI) is remarkably decreased. This is because, when the magnetic pole 35 has the edge 35G like the Experiment 1-3, the peak intensity in a region facing the magnetic pole 35 is relatively increased, that is, the positive gradient of the magnetic field is increased. As a result, after the primary writing process, overwriting and deletion are performed by the large recording magnetic field.

In contrast, in the Experiment 1-4, since overwriting and deletion after the writing are suppressed, the decrease in SNR with the increase in recording density is gentle.

3. Front End Shape of Magnetic Pole

Experiment 2-1

Figure 14:
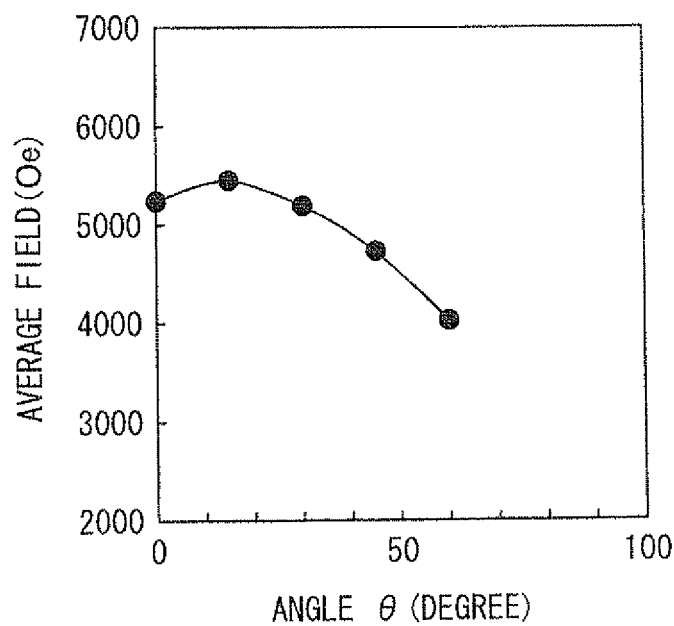
FIG. 14 is a characteristic diagram illustrating a relationship between an angle of an inclined surface of a magnetic pole and an intensity of a recording magnetic field in Experiment 2-1.

Next, with respect to the magnetic read write head 10 of the above-described first embodiment, a relationship between the intensity of the recording magnetic field generated near the end surface 35S1 and the angle θ formed by the ABS 11S and the inclined surface 35S3 was determined by simulation based on a finite element method. In this example, the thickness T3 was 50 nm. In addition, the thickness 351T of the first layer 351 was 250 nm, and the thicknesses T1 and T2 were 40 nm and 20 nm, respectively. The result is illustrated in FIG. 14. In FIG. 14, the horizontal axis indicates the angle θ, and the vertical axis indicates the intensity of the recording magnetic field (average).

As illustrated in FIG. 14, it was found that higher intensity of the recording magnetic field is obtained when the angle θ is larger than 0 and 30° or less.

Experiment 2-2

Figure 15:
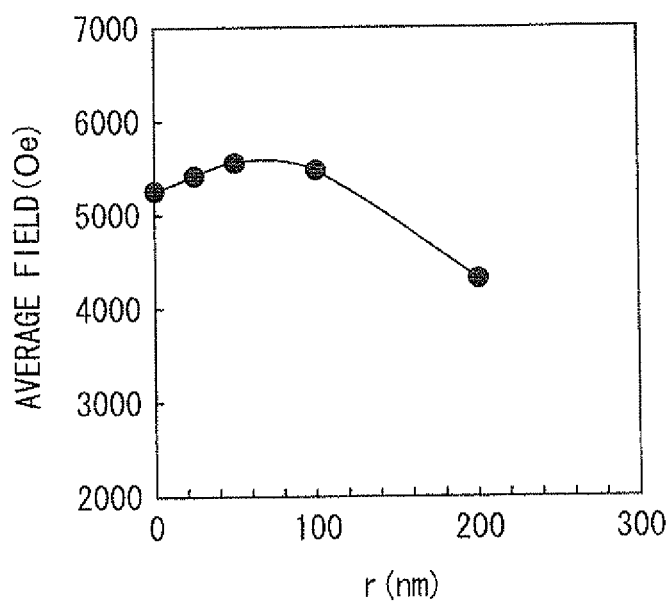
FIG. 15 is a characteristic diagram illustrating a relationship between a radius of curvature of a tip section of a magnetic pole and intensity of a recording magnetic field.

Next, with respect to the magnetic read write head 10A of the above-described second embodiment, a relationship between the intensity of the recording magnetic field generated near the end surface 35S1 and a radius of curvature of the curved surface 35S4 was determined by simulation based on a finite element method. In this example, the thickness 351T of the first layer 351 was 250 nm, and the thicknesses T1 and T2 were 40 nm and 20 nm, respectively. The result is illustrated in FIG. 15. In FIG. 15, the horizontal axis indicates the radius of curvature of the curved surface 35S4, and the vertical axis indicates the intensity of the recording magnetic field (average).

As illustrated in FIG. 15, it was found that higher intensity of the recording magnetic field is obtainable when the radius of curvature is larger than 0 and 100 nm or less.

As described above, although the invention has been described with reference to the embodiments, the invention is not limited to the above-described embodiments, and various modifications may be made. For example, in the present embodiment, although a read element is described by taking a CPP-type GMR element as an example, this is not limited thereto and may be a CIP (Current In Plane)-GMR element. In such a case, an insulating layer is necessary to be provided between an MR element and a lower shield layer and between the MR element and an upper shield layer, and a pair of leads supplying a sense current to the MR element is necessary to be inserted into the insulating layer. Alternatively, a TMR (tunneling magnetoresistance) element with a tunnel junction film may be used as a read element.

In addition, in the thermally-assisted magnetic write head of the invention, the structures (such as shapes and positional relationships) of the waveguide, the plasmon generator, the magnetic pole, etc., are not limited to those described in the above-described embodiments, and any thermally-assisted magnetic write head may have other structure.

The correspondence relationships between the reference numerals and the components of the present embodiments are collectively illustrated as follows. 1 . . . housing, 2 . . . magnetic disc, 3 . . . head arm assembly (HAA), 4 . . . head gimbal assembly (HGA), 4A . . . magnetic head device, 4B . . . suspension, 5 . . . arm, 6 . . . driver, 7 . . . fixed shaft, 8 . . . bearing, 9 . . . spindle motor, 10 . . . magnetic read write head, 11 . . . slider, 11A . . . element forming surface, 11B . . . back surface, 11S . . . air bearing surface (ABS), 13 . . . insulating layer, 14 . . . read head section, 16 . . . write head section, 17 . . . cladding, 21 . . . lower shield layer, 22 . . . MR element, 23 . . . upper shield layer, 24, 25, 27, 38, 39, 42 . . . insulating layer, 28 . . . lower yoke layer, 29 . . . leading shield, 30, 36, 37 . . . connecting layer, 31, 33 . . . cladding layer, 32 . . . waveguide, 34 . . . plasmon generator, 34G . . . tip section, 34S1 . . . surface plasmon exciting surface, 35 . . . magnetic pole, 351 . . . first layer, 352 . . . second layer, 41 . . . coil, 43 . . . upper yoke layer, 45 . . . laser light, 46 . . . evanescent light, 47 . . . surface plasmon, 100 . . . LSI, 101 . . . ROM, 111 . . . write gate, 121 . . . constant current circuit, 122 . . . amplifier, 123 . . . demodulation circuit, 131 . . . laser control circuit, 132 . . . temperature detector, NF . . . near-field light.

What is claimed is:

1. A thermally-assisted magnetic write head comprising:
a waveguide;
a magnetic pole; and
a plasmon generator interposed between the waveguide and the magnetic pole, wherein
the magnetic pole includes a first surface exposed on an air bearing surface, a second surface facing the plasmon generator, and a third surface connecting the first surface and the second surface, and
the third surface extending away from the plasmon generator when approaching the air bearing surface.

2. The thermally-assisted magnetic write head according to claim 1, wherein the third surface includes a flat surface inclined with respect to the first surface and the second surface, or includes a curved surface.

3. The thermally-assisted magnetic write head according to claim 1, wherein a front end surface of the magnetic pole and a front end surface of the plasmon generator are separated away from each other in the air bearing surface.

4. The thermally-assisted magnetic write head according to claim 1, wherein a width of a front end surface of the magnetic pole is larger than a width of a front end surface of the plasmon generator.

5. The thermally-assisted magnetic write head according to claim 4, wherein a width of the waveguide is larger than the width of the front end surface of the magnetic pole.

6. The thermally-assisted magnetic write head according to claim 5, wherein the plasmon generator includes a forward section and a backward section, the forward section having a uniform width, the backward section being connected to a rear end of the forward section and having a width increasing with increase in distance from the forward section.

7. The thermally-assisted magnetic write head according to claim 2, wherein the curved surface included in the third surface has a radius of curvature of 100 nm or less.

8. The thermally-assisted magnetic write head according to claim 2, wherein an external angle between the flat surface included in the third surface and the air bearing surface is equal to or smaller than 45°.

9. The thermally-assisted magnetic write head according to claim 1, wherein the waveguide and the plasmon generator are separated away from each other.

10. A head gimbal assembly comprising:
- a magnetic head slider having a side surface, the side surface being provided with the thermally-assisted magnetic write head according to claim 1; and
- a suspension having an end, the end being provided with the magnetic head slider.

11. A head arm assembly comprising:
- a magnetic head slider having a side surface, the side surface being provided with the thermally-assisted magnetic write head according to claim 1;
- a suspension having a first end and a second end, the first end being provided with the magnetic head slider; and
- an arm supporting the second end of the suspension.

12. A magnetic disk unit with a magnetic recording medium and a head arm assembly, the head arm assembly comprising:
- a magnetic head slider having a side surface, the side surface being provided with the thermally-assisted magnetic write head according to claim 1;
- a suspension having a first end and a second end, the first end being provided with the magnetic head slider; and
- an arm supporting the second end of the suspension.

* * * * *